(12) United States Patent
Amdisen et al.

(10) Patent No.: US 6,884,337 B2
(45) Date of Patent: *Apr. 26, 2005

(54) PRODUCTION OF BASIC HYDROGEN PEROXIDE FOR CHEMICAL OXYGEN-IODINE LASER DEVICES

(75) Inventors: Peter D. Amdisen, West Hills, CA (US); Thomas L. Bunn, Simi Valley, CA (US); Alan Z. Ullman, Northridge, CA (US)

(73) Assignee: The Boeing Company, Seattle, WA (US)

( * ) Notice: Subject to any disclaimer, the term of this patent is extended or adjusted under 35 U.S.C. 154(b) by 443 days.

This patent is subject to a terminal disclaimer.

(21) Appl. No.: 10/151,610

(22) Filed: May 20, 2002

(65) Prior Publication Data

US 2003/0213701 A1 Nov. 20, 2003

(51) Int. Cl.[7] .................................................. C25B 1/30
(52) U.S. Cl. ...................... 205/466; 205/516; 205/536; 205/620; 423/584
(58) Field of Search ................................ 205/466, 516, 205/536, 620; 423/584

(56) References Cited

U.S. PATENT DOCUMENTS

| | | | |
|---|---|---|---|
| 4,749,453 A | * | 6/1988 | Harris .......................... 205/343 |
| 5,199,041 A | | 3/1993 | Schmiedberger et al. |
| 5,378,449 A | | 1/1995 | Dinges |
| 5,658,488 A | | 8/1997 | Lonergan et al. |
| 5,907,573 A | | 5/1999 | Ullman et al. |
| 6,004,449 A | * | 12/1999 | Vetrovec ...................... 205/466 |
| 6,010,640 A | | 1/2000 | Beshore et al. |
| 6,562,225 B1 | * | 5/2003 | Vetrovec ...................... 205/466 |

* cited by examiner

*Primary Examiner*—Arun S. Phasge
(74) *Attorney, Agent, or Firm*—Alston & Bird LLP

(57) ABSTRACT

A method of generating basic hydrogen peroxide (BHP) fuel for a chemical oxygen-iodine laser (COIL) using stored alkali chloride, typically potassium chloride, and water. The alkali chloride and water are mixed to form a saturated or nearly saturated aqueous salt solution for use as an anolyte feed to a chlor-alkali cell. The chlor-alkali cell generates alkali hydroxide, hydrogen, and chlorine. Water and oxygen are reacted to form peroxide which is combined with the alkali hydroxide from the chlor-alkali cell to form a dilute solution of BHP, a mixture of hydrogen peroxide and alkali hydroxide, which dissociates into $O_2H^-$ and $^-OH$. The BHP is concentrated and the molar ratio of hydrogen peroxide to alkali hydroxide is adjusted to 1:1 before the BHP is supplied to a COIL apparatus as fuel for the lasing process.

12 Claims, 2 Drawing Sheets

PRODUCTION OF BASIC HYDROGEN PEROXIDE FOR CHEMICAL OXYGEN-IODINE LASER DEVICES

FIELD OF THE INVENTION

The invention relates to a method for production of basic hydrogen peroxide (BHP) for use in a Chemical Oxygen-Iodine Laser (COIL). More specifically, the invention relates to a method of manufacturing BHP without the need for hazardous handling, transportation, or storage of hydrogen peroxide and alkali hydroxide.

BACKGROUND OF THE INVENTION

The chemical oxygen-iodine laser (COIL) is a short wavelength high-power chemical laser with wide ranging industrial, technological, and military applications. The COIL produces a laser beam with a 1.315-$\mu$m wavelength, which is well suited to a variety of uses. The COIL also has one of the best beam qualities of any available laser, which allows for clean cuts and welds, as well as simple beam correction and direction.

COILs are powered by solutions of basic hydrogen peroxide (BHP). BHP is generated by the combination of alkali hydroxide, including lithium, sodium, and potassium hydroxide, with hydrogen peroxide according to the equation:

$$OH^- + H_2O_2 + M^+ \rightarrow O_2H^- + H_2O + M^+ \quad (I)$$

where $M^+$ is any of the $Li^+$, $Na^+$ or $K^+$ ions, or other suitable ions, or mixture of these ions. The term BHP typically refers to a solution having 4 molar to 8 molar concentration of perhydroxyl ion ($O_2H^-$), which is formed by the reaction:

$$OH^- + H_2O_2 \rightarrow O_2H^- + H_2O \quad (II)$$

The perhydroxyl anions and alkali cations of the aqueous BHP solution are then reacted with chlorine gas according to the equation:

$$Cl_2 + 2O_2H^- + 2M^+ \rightarrow H_2O_2 + 2MCl + O_2(^1\Delta) \quad (III)$$

The resultant singlet delta oxygen ($O_2(^1\Delta)$) is an excited state of oxygen. Water vapor may be removed from the products of reaction (III) and the products are accelerated to supersonic velocity in an expansion nozzle to create a laser gain region. Molecular iodine is injected and mixed with the gas flow. The singlet delta oxygen has a resonance frequency very close to the resonance frequency of atomic iodine and, when intermingled, the singlet delta oxygen causes the rapid dissociation of the diatomic iodine molecule and the excitation of the iodine atoms. Energy is released in the form of light, which is extracted from the excited iodine atoms by a laser resonator positioned transverse to the direction of gas flow. The exhaust gases are usually removed and scrubbed to remove residual chlorine and iodine. The BHP is recycled until approximately 50-mol % of the perhydroxyl anions have been used.

In order to generate the high-power laser required for industrial and military applications, a COIL requires large initial volumes of alkali hydroxides and hydrogen peroxide. The need to transport and store large volumes of these materials presents a large hazard, especially in the industrial and military environments in which they will be used. Concentrated alkali hydroxides are extremely corrosive. Concentrated hydrogen peroxide is also a logistical problem.

$H_2O_2$ is extremely reactive and subject to autocatalytic decomposition as well as rapid decomposition upon exposure to a variety of trace impurities. The decomposition may be accelerated by exposure to agitation, exposure to rough surfaces, or exposure to metals.

Several prior art references teach methods of recycling BHP after use so that fresh supplies of $H_2O_2$ need not be supplied during operation of a COIL, but there still remains the problems presented by transportation and storage of the large initial volumes of $H_2O_2$ and MOH required for operation of the COIL device.

What is needed is a method of supplying large quantities of BHP, on-site, to a COIL device without the hazardous transportation and long-term storage of peroxide and caustic alkali hydroxide materials.

SUMMARY OF THE INVENTION

The invention is a method of generating basic hydrogen peroxide (BHP) fuel for a chemical oxygen-iodine laser (COIL) using relatively inert starting materials, i.e. an alkali chloride salt and water. The invented method eliminates the need to store large quantities of hydrogen peroxide and alkali hydroxides on site, thus eliminating the need for monitoring systems and protective equipment, and lowering the likelihood of mishap with highly reactive hydrogen peroxide and caustic. As a further benefit of the invention, the same process also produces the chlorine, or other halogen, required for reaction with BHP in accordance with reaction (III) above.

In general, the invented method begins with the storage of alkali chloride, such as potassium chloride, and water. The alkali chloride may be stored as a dried solid or as a saturated or supersaturated aqueous solution. Of course, if a water source of adequate cleanliness is readily available, then large amounts of water need not be stored.

The alkali chloride and water is mixed to form a saturated or nearly saturated aqueous brine solution for use as an anolyte feed to a base production apparatus such as a membrane-type chlor-alkali cell. The electrolytic operation of a chlor-alkali cell uses the anolyte feed to generate a stream of alkali hydroxide, a gaseous stream of hydrogen, and a gaseous stream of chlorine.

The alkali hydroxide from the chlor-alkali cell, together with oxygen from air, an air enrichment apparatus, or a supply of stored oxygen are fed to a peroxide production apparatus ("peroxide cell") such as a membrane-type electrolytic cell to produce hydrogen peroxide. There are a variety of methods for generating hydrogen peroxide in aqueous KOH solutions, including electrolytic, catalytic, and organic reaction schemes. The gaseous stream of hydrogen from the chlor-alkali cell may also be used as a reactant in the formation of hydrogen peroxide, depending on the chosen reaction scheme.

The output of a typical peroxide generator, such as a membrane-type electrolytic cell, is a combination of hydrogen peroxide and alkali chloride with a molar ratio of approximately 1:2 ($H_2O_2$:MOH). A COIL apparatus generally requires BHP having a ratio of approximately 1:1 ($H_2O_2$:MOH). In order to obtain a molar ratio of 1:1, an acid, typically HCl, may be added to the BHP leaving the peroxide generator prior to use in a COIL apparatus in order to neutralize a portion of the alkali hydroxide. The acid may be generated by reacting portions of the chlorine stream and hydrogen stream from the chlor-alkali cell to form HCl.

Alternatively, the $H_2O_2$:MOH molar ratio of 1:1 can be realized by employing an alkaline peroxide electrolytic cell with an acid anolyte of the peroxide cell. In this embodiment, the MOH formed in the chlor-alkali cell and oxygen, or air, flows to the alkaline peroxide cell and $H_2O_2$ and MOH are produced in a 1:1 ratio. Other methods of producing $H_2O_2$ may also be used, such as catalytic or organic reactions.

Alkali chloride and water products resulting from the neutralization step must be removed from the BHP solution prior to use in a COIL. To remove the alkali chloride and water, the BHP stream is chilled and the salt and water are separated from the BHP. Both the alkali chloride and the water so collected may be recycled to the chlor-alkali cell.

Thus, the invention provides a method of producing basic hydrogen peroxide (BHP) which is substantially free of alkali chloride and water and which has $H_2O_2$ and alkali hydroxide components in the proper molar relationship for use in a COIL apparatus. The method provides the BHP from alkali chloride, water, and a source of oxygen without the need to store or transport the relatively hazardous hydrogen peroxide and alkali hydroxide reactants previously used to generate BHP.

BRIEF DESCRIPTION OF THE DRAWINGS

Figure 1:
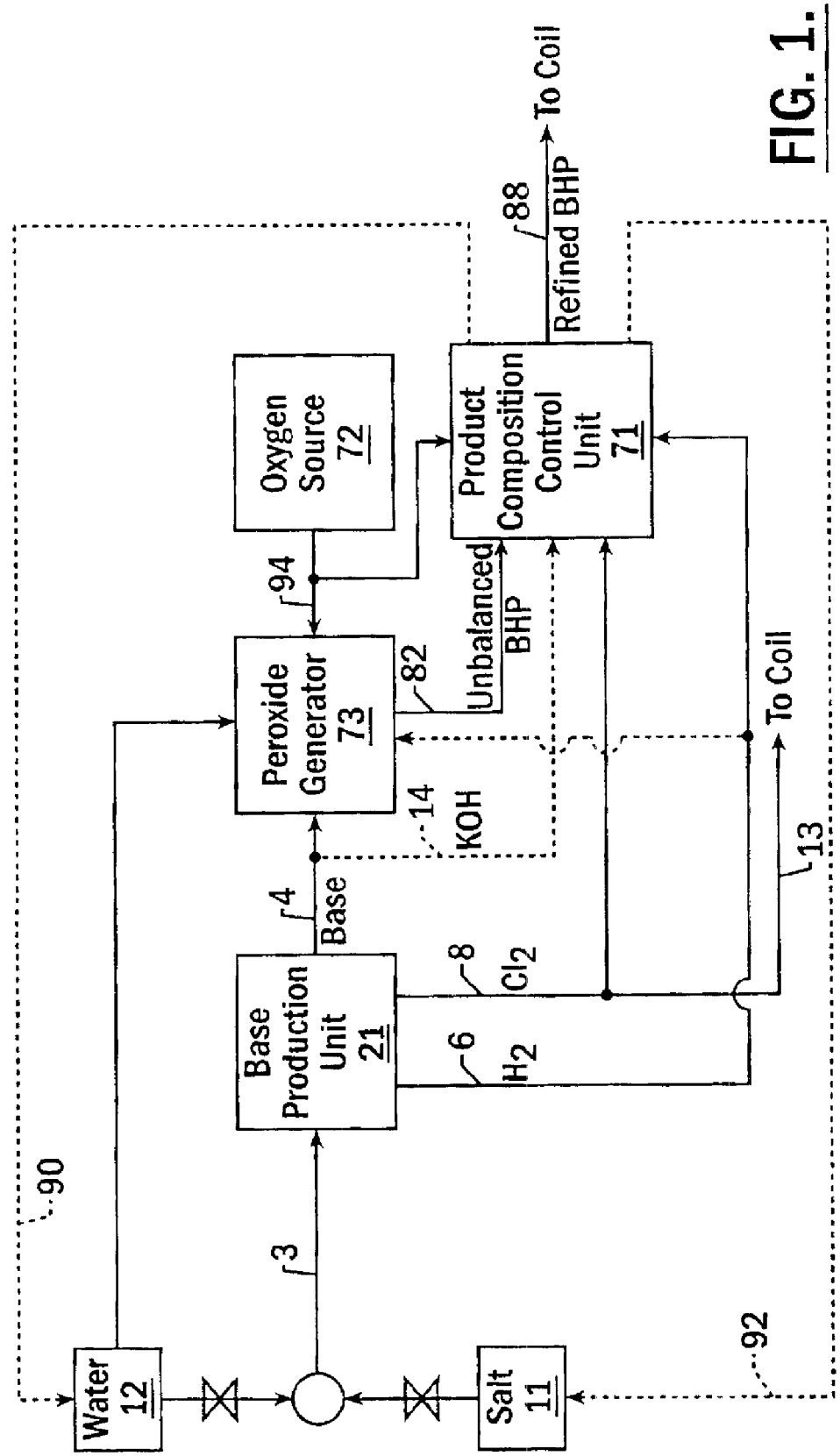

Having thus described the invention in general terms, reference will now be made to the accompanying drawings, which are not necessarily drawn to scale, and wherein:

FIG. 1 is a block diagram of an embodiment of the invented chemical system; and

Figure 2:
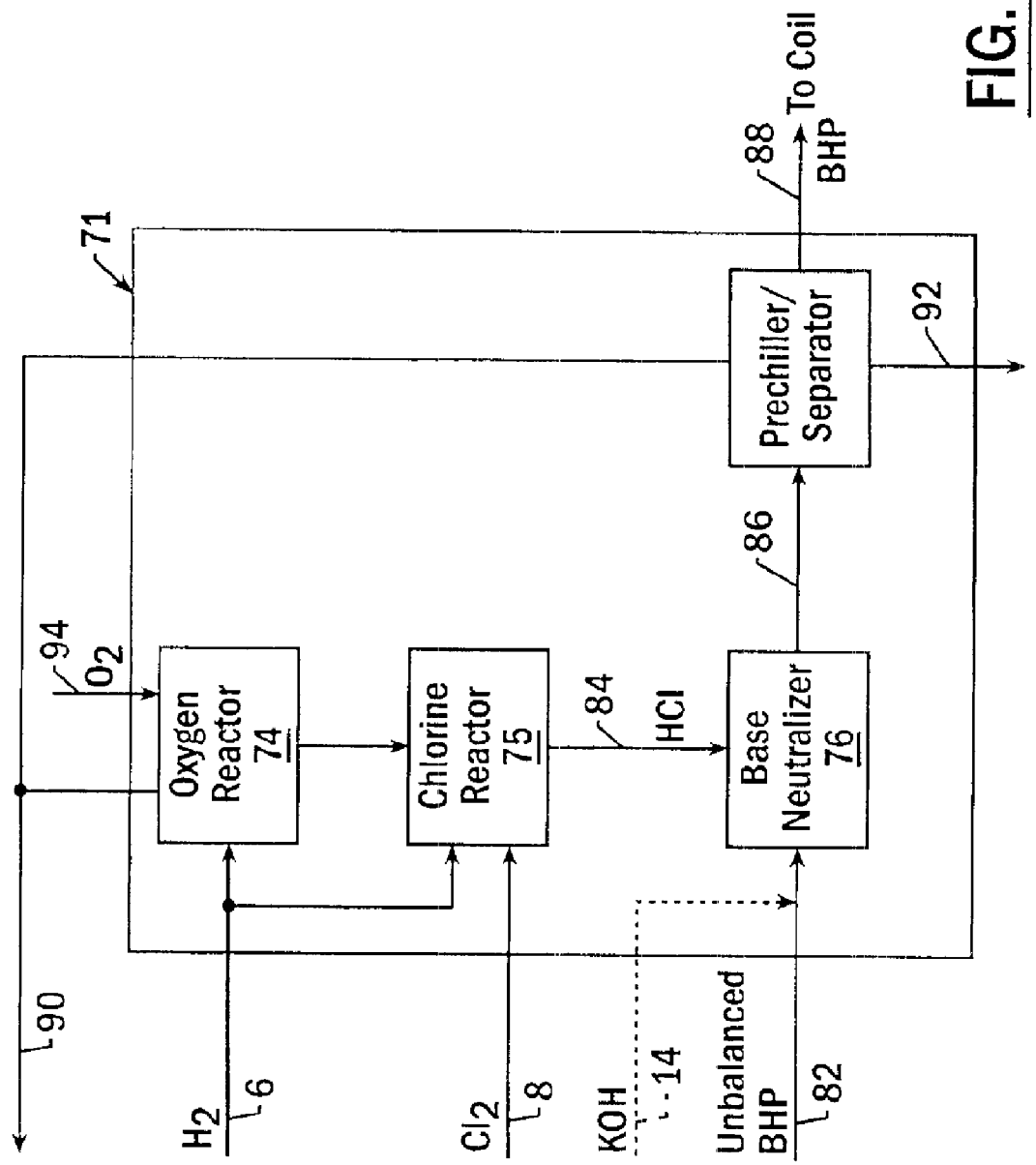

FIG. 2 is a block diagram of an embodiment of the process of this invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with this invention, the alkali hydroxide and hydrogen peroxide needed for the production of BHP are produced on site from water, alkali chloride salt, and oxygen. The alkali chloride material may be easily stored, and the necessary water or oxygen may be either stored or readily obtained from commonly available sources. Through a series of reactions, alkali hydroxide and hydrogen peroxide are produced and concentrated to form BHP in quantities and in proper molar ratios sufficient to power a COIL device. As a further benefit, chlorine, or other halogens, required for operation of the COIL device are also produced.

Reactant potassium hydroxide (KOH) and byproduct potassium chloride (KCl) are typically used as the alkali hydroxide and alkali halide components in the operation of COIL devices. Therefore, KOH and KCl are used throughout this description as exemplary alkali hydroxide and alkali halide compositions for use with the invention. Though KOH and KCl are used as exemplary alkyl hydroxide and chloride, it is noted that analogous reactions and compositions may be obtained with other alkali hydroxides and halides as known in the art and statements with regard to potassium hydroxide or chloride are generally applicable to alkali hydroxides and chlorides. For instance, U.S. Pat. No. 6,010,640 presents a method of using LiOH rather than KOH as the alkali hydroxide for use with a COIL device.

As used herein, BHP means any chemical solution having appreciable amounts of the dissociation components of alkali hydroxide and hydrogen peroxide, i.e. $O_2H^-$ and $K^+$ when potassium is the alkali component, wherein the primary active species is the perhydroxyl ion ($O_2H^-$). BHP for use in a COIL device is preferably a mixture of KOH and $H_2O_2$ having a molar relationship of approximately 1:1 ($KOH:H_2O_2$). In an aqueous solution, the KHO and $H_2O_2$ of the BHP form the perhydroxyl ion through the following acid-base reaction:

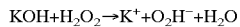

COIL devices are most favorably operated, and the resultant BHP of the overall invented process is preferably carried out at BHP solution concentrations between about 4 moles $O_2H^-$/L and 8 moles $O_2H^-$/L.

Referring to FIG. 1, which shows an embodiment of the invention, alkali halide salt 11 and water 12 are stored on-site, ready for use in the generation of BHP fuel. Water may be stored on-site in a container such as a tank, or may be drawn from a natural or municipal source. The salt is also stored in a container such as a tank. The salt and water are mixed to form an aqueous salt solution 3. It is preferred that the salt solution 3, for example KCl solution, be a saturated or nearly saturated solution. Potassium chloride is the preferred alkali halide because it is a readily available, naturally occurring compound which is soluble in water in the amount of about 1 gram per 2.8 ml at standard temperature, and has a pH of about 7. In general, the alkali halide salts are inert and stable, and may be stored safely for indefinite periods.

The aqueous salt solution 3 is fed as an anolyte material to a base production unit 21, such as a chlor-alkali cell. When a chlor-alkali cell is used as the base production unit 21, the cell 21 acts in fundamentally the same manner as the sodium chloride chlor-alkali cells used in caustic soda production, such as those discussed in U.S. Pat. No. 4,459, 188. In operation, the anolyte salt solution is contained within an anode chamber of the chlor-alkali cell. By application of an electric charge to the aqueous salt solution, chloride ions are oxidized at the anodes of the chlor-alkali cell to chlorine. Alkali metal ions are transported through an ion exchange membrane, into a cathode chamber of the chlor-alkali cell. In the cathode chamber, the water is reduced at the cathodes of the cell to form hydroxide anions in aqueous solution. The overall reaction provided by the chlor-alkali cell 21 is:

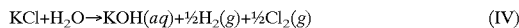

where the KCl and $H_2O$ are fed to the chlor-alkali cell 21 as a saturated, aqueous alkali chloride salt solution via inlet stream 3. The main product stream of KOH is released from the cell via outlet stream 4. The hydrogen product is released from the cell via a hydrogen gas outlet stream 6, and the chlorine product is released from the cell via a chlorine gas outlet stream 8. In general, therefore, the outputs of the base production unit 21 are a caustic solution 4, chlorine gas 8, and hydrogen gas 6.

Water flow from the water source 12 to the chlor-alkali cell 21 is controlled so as to maintain the appropriate concentration of the KCl solution 3 entering the chlor-alkali cell 21. The KCl is preferably a saturated brine solution, which has minimal solids suspended within the solution which might interfere with the ion exchange membrane of the cell. Water may be added to the KCl solution 3 from water stored within the system, water taken from a natural reservoir or municipal water supply, or water generated with oxygen by combination of a portion of the $O_2$ from an oxygen enrichment apparatus 72 with a portion of the $H_2$ from reaction (IV) of the chlor-alkali cell 21.

At least a portion of the caustic solution 4 is used as an input to a hydrogen peroxide generator 73. Oxygen 94 and water 12 are also inputs to the peroxide production unit 73. This invention is described in terms of peroxide generator that employs a base (i.e. KOH), but would be applicable to a peroxide generator that employs an acid (i.e. $H_2SO_4$) anolyte also. The water is provided from the stored water or water source 12 and oxygen is provided from a storage unit, from the air, or from an oxygen enrichment apparatus 72.

The hydrogen peroxide generator 73 is a reactor, which produces hydrogen peroxide by one of several methods, including catalytic, organic, or electrochemical methods. An exemplary method of catalytic peroxide production is given in U.S. Pat. Nos. 5,972,305 and 5,976,486, an exemplary method of organic peroxide production is the commercially known Anthraquinone method and the method shown in U.S. Pat. No. 5,902,559, and exemplary methods of electrochemical peroxide production are given in U.S. Pat. Nos. 4,357,217; 4,384,931; 4,430,176; 5,565,073; 5,647,968; and 6,159,349.

It is preferred that hydrogen peroxide be generated with an electrolytic hydrogen peroxide generator 73. A particularly preferred method of electrolytic generation of hydrogen peroxide is found in the Journal of Applied Electrochemistry 25 (1995) pages 613–627 by PC Foller entitled, "Processes for the production of mixtures of caustic soda and hydrogen peroxide via the reduction of oxygen". By using the electrolytic cell synthesis, no supplemental catalysts or organic solvents need to be maintained or supplied on site. Further, it is likely that electric current will be available when practicing this invention, either through a municipal power supply or from a portable generator.

In one embodiment of the invention, the peroxide generator forms hydrogen peroxide electrolytically from water and oxygen according to the overall reaction:

$$H_2O + \tfrac{1}{2}O_2 \rightarrow H_2O_2 \quad (V)$$

According to the reaction of (V) in an electrochemical cell, $OH^-$ is oxidized at the anode of the cell according to the equation $2KOH \rightarrow K^+ + 2e^- + \tfrac{1}{2}O_2 + H_2O$. At the cathode, oxygen is reduced according to the equation $O2+H2O+2e- \rightarrow OH-+O2H-$. Potassium ions, K+, are transported across the cation exchange membrane, thereby carrying the current and balancing the charge of the OH— and $O_2H$— anions in the cathode.

Oxygen is preferably supplied 94 to the hydrogen peroxide generator 73, at or near the time of BHP production, from an air enrichment apparatus 72 which removes oxygen from the air, such as a model OG-5000 oxygen generator manufactured by Oxygen Generating Systems, Inc. of Niagara Falls, N.Y. Alternatively, the oxygen required for the hydrogen peroxide production may be supplied in gas cylinders or generated by chemical reaction on site.

The KOH necessary for hydrogen peroxide production within the hydrogen peroxide generator 73 is preferably supplied from the main KOH stream 4 of the chlor-alkali cell 21. Depending on the chosen method of $H_2O_2$ production, KOH may or may not be involved in the reaction to produce peroxide. In either peroxide generator 73, KOH is not consumed by the reaction. Rather using the preferred reaction of (V), a supply of an aqueous solution of about 20 wt % KOH feeds the $H_2O_2$ generator to result in a product solution containing a 1:1 molar ratio of $KOH:H_2O_2$.

The output of the peroxide production unit 73 is a dilute solution of basic hydrogen peroxide 82 (BHP) that may or may not be produced in the desired molar ratio of 1 mole KOH to 1 mole $H_2O_2$. The dilute BBP goes through a product composition control unit 71 to balance the molar ratio of caustic and peroxide and to concentrate the solution bringing the molar concentration of the perhydroxyl anion up to 8M. All or a portion of the chlorine 8 and hydrogen 6 produced in the base production unit 21 is also used in the product composition control unit 71 to obtain the proper 1:1 molar ratio of $KOH:H_2O_2$ within the BHP stream 88. As part of the BHP concentration process within the composition control unit 71, water and salt are removed from the BHP. The removed water 90 and salt 92 is optionally recycled back to the water supply 12 and salt supply 11, respectively. Excess water removed in this unit may be reused in the base production unit 21 or peroxide production unit 73, or disposed.

Referring to FIG. 2, a preferred product composition control unit 71 is shown having an oxygen reactor 74, a chlorine reactor 75, a base neutralizing unit 76, and a prechiller/separator 77. The hydrogen peroxide stream 82 leaving the hydrogen peroxide reactor 73 is base-rich, with a nominal molar ratio of 2:1 ($KOH:H_2O_2$). The base-rich BKP stream may also contain residual amounts of KCl, which are preferably removed before the BHP composition is used to fuel a COIL device.

For use in a COIL device, the molar ratio of KOH to $H_2O_2$ should be approximately 1:1. In this embodiment, acid (HCl) is preferably added to the BHP solution leaving the peroxide generator, which is nominally 2:1 $KOH:H_2O_2$ in order to neutralize it before it is concentrated and used in the COIL apparatus. To this end, streams of hydrogen 6 and chlorine 8 gases, evolved from the chlor-alkali cell 21, are combined in a chlorine reactor 75 to form hydrochloric acid according to the reaction:

$$H_2 + Cl_2 \rightarrow 2HCl \quad (VI)$$

This reaction typically occurs in the presence of UV light or on the surface of a catalyst. The production of HCl from $H_2$ and $Cl_2$ is well known in the art.

Production of HCl does not use all $Cl_2$ generated by the chlor-alkali cell, and excess $Cl_2$ from the chlor-alkali cell 21 is either stored for later use or fed 13 to the COIL laser when it is ready to be fired.

A stream of HCl 84 from the chloride reactor 75 is then reacted with the base-rich peroxide/BHP stream 82 in a base neutralizing reactor 76. A portion of the KOH from the base-rich BHP mixture is reacted with the HCl to form potassium chloride and water according to the following acid-base reaction:

$$KOH + HCl \rightarrow KCl + H_2O \quad (VII)$$

HCl is added to the solution until the molar ratio of KOH to $H_2O_2$ approximates 1:1. At this point, the BHP stream is composed primarily of BHP ($O_2H^-$, $H_2O$, and $K^+$), water, and KCl in an aqueous solution.

Because the KCl may precipitate in a BHP solution and harm or interfere with the operation of the COIL apparatus as the BHP is cooled and pumped through the COIL device, most of the KCl must be removed from the BHP stream. The BHP stream 86 from the base neutralizer 76 is chilled to a low temperature, typically about −20° C., for removal of salt in a prechiller/separator apparatus 77 to remove the salt.

Most of the KCl is filtered and removed from the BHP solution. Also, excess water is preferably removed from the BHP solution. Water may be removed by vacuum evaporation or other methods such as simply freezing the water out of solution in the prechiller/separator 77. After water and salt are removed from the BHP and after the molar ratio of KOH:$H_2O_2$ is adjusted to 1:1, the concentration of the BHP will be in the desired range of between 4 moles $O_2H^-$/L and 8 moles $O_2H^-$/L. The resulting molar balanced and filtered BHP solution 88 which has a proper molar balance of KOH and $H_2O_2$ and has been filtered for removal of KCl and/or water is stored or fed 88 directly to a COIL apparatus.

Neither the KCl 92, which is removed from the BHP solution, or the water 90, which is also removed from the solution, are environmentally hazardous and may be easily reused or disposed. Preferably, the KCl 92 and water 90 are recycled back to the main feed of the chlor-alkali cell 21, or alternatively the KCl 92 and water 90 may be stored 11, 12 for later use. In this manner, both KCl and water are conserved by the invented process. In this preferred embodiment, KCl and water are continually recycled back to the chlor-alkali 21 feed, so only oxygen 94 and energy are required for the continual generation of BHP. Of course, it is not necessary to the invention that the KCl 92 or water 90 be recycled.

If an acid anolyte peroxide cell is used in place of the base anolyte cell, then it may be that the BHP is produced with a KOH:$H_2O_2$ molar ratio of less than 1. In this case a portion of the caustic stream 14 leaving the chlor-alkali cell 21 is combined with the BHP stream 82 leaving the peroxide generator 73 in addition to being fed to the peroxide generator 73.

Spent fuel from a COIL apparatus contains amounts of KCl and water, which may be removed from the spent fuel. The KCl and water from the spent BHP may be recycled back to the KCl or water storage areas 11,12 or fed directly back to the chlor-alkali cell 21 for regeneration of the BHP.

By using the invented method, stable, environmentally acceptable and non-hazardous components, such as water and alkali chloride materials, may be used to generate fuel for a COIL laser system. The invention eliminates the need to store and transport dangerous materials, such as hydrogen peroxide, potassium hydroxide, and chlorine gas required for operation of a COIL system.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A process for preparing basic hydrogen peroxide (BHP) comprising:

supplying alkali chloride and water from storage as an aqueous solution to a chlor-alkali cell;

introducing said aqueous alkali chloride solution into the chlor-alkali cell, thereby producing a liquid aqueous alkali hydroxide product stream, a hydrogen gas stream, and a chlorine gas stream, supplying an oxygen containing gas, reacting the oxygen in said oxygen containing gas with water from storage in the presence of at least a first portion of the alkali hydroxide product stream to produce a BHP solution stream containing $H_2O_2$ and dissociation products thereof, alkali hydroxide and dissociation products thereof, and water.

2. The method of claim 1, wherein the alkali chloride is selected from lithium chloride, sodium chloride, and potassium chloride.

3. The method of claim 1, further comprising the step of mixing at least a second portion of the alkali hydroxide product stream with the BHP solution stream.

4. The method of claim 1, further comprising:

reacting hydrogen from a first portion of the hydrogen gas stream with chlorine from a portion of the chlorine gas stream to form an HCl product stream, and neutralizing basic components of the BHP solution stream with the HCl product stream.

5. The method of claim 4, wherein the step of neutralizing the basic components within the BHP produces alkali chloride and wherein said method further comprises:

chilling the neutralized BHP stream, and separating alkali chloride and water from the chilled neutralized BHP stream.

6. The process of claim 5, further comprising:

feeding the chilled and neutralized BHP stream from the alkali chloride separation step to a COIL apparatus, recovering alkali chloride and water from the spent BHP stream leaving the COIL apparatus, and recycling the recovered alkali chloride and water to the chlor-alkali cell.

7. The process of claim 5, further comprising recycling at least a portion of the water and alkali chloride from the chilled and neutralized BHP stream to the chlor-alkali cell.

8. The process of claim 5, further comprising recycling at least a portion of the water and at least a portion of the alkali chloride from the chilled and neutralized BHP stream to the supply of stored water and alkali chloride, respectively.

9. The process of claim 1, further comprising the step of reacting hydrogen from a second portion of the hydrogen gas stream with oxygen from the oxygen containing gas to form a water stream.

10. The process of claim 9, wherein at least a portion of the water stream is recycled to the chlor-alkali reactor.

11. The process of claim 1, wherein the oxygen is supplied from an air-oxygen enrichment apparatus.

12. A process for preparing basic hydrogen peroxide (BHP) comprising:

storing a supply of alkali chloride, storing a supply of $H_2O$, supplying alkali chloride and $H_2O$ from storage as an aqueous solution to a chlor-alkali cell, feeding said aqueous alkali chloride solution into the chlor-alkali cell to produce alkali hydroxide and chlorine, supplying oxygen, feeding the water, the oxygen, and the alkali hydroxide into a peroxide generator to produce BHP, producing HCl from at least a portion of the chlorine produced by the chloro-alkali cell, and supplying the BHP as fuel to a COIL apparatus.

* * * * *